(12) United States Patent
Yuan

(10) Patent No.: US 10,118,216 B1
(45) Date of Patent: Nov. 6, 2018

(54) THRUST RIVET GUN

(71) Applicant: Yuyao Tangwen Tool Co., Ltd., Yuyao (CN)

(72) Inventor: Jianming Yuan, Yuyao (CN)

(73) Assignee: YUYAO TANGWEN TOOL CO., LTD, Yuyao (CN)

( * ) Notice: Subject to any disclaimer, the term of this patent is extended or adjusted under 35 U.S.C. 154(b) by 0 days.

(21) Appl. No.: 15/668,685

(22) Filed: Aug. 3, 2017

(30) Foreign Application Priority Data

Jul. 26, 2017 (CN) .......................... 2017 1 0616028
Jul. 26, 2017 (CN) ...................... 2017 2 0913102 U

(51) Int. Cl.
*B21J 15/04* (2006.01)
*B21J 15/38* (2006.01)
*B21J 15/36* (2006.01)
*B23P 11/00* (2006.01)

(52) U.S. Cl.
CPC .......... *B21J 15/386* (2013.01); *B21J 15/043* (2013.01); *B21J 15/36* (2013.01); *B23P 11/00* (2013.01)

(58) Field of Classification Search
CPC ........ B21J 15/386; B21J 15/043; B21J 15/36; B23P 11/00
USPC ..................................................... 29/243.527
See application file for complete search history.

(56) References Cited

U.S. PATENT DOCUMENTS

| | | | | |
|---|---|---|---|---|
| 5,323,521 A * | 6/1994 | Freund | .................. | B21J 15/043 |
| | | | | 29/243.527 |
| 5,359,762 A * | 11/1994 | Liu | ........................ | B21J 15/043 |
| | | | | 29/243.521 |
| 5,367,757 A * | 11/1994 | Liu | ........................ | B21J 15/043 |
| | | | | 29/243.527 |
| 7,146,698 B2 * | 12/2006 | Kovar | ...................... | B21J 15/36 |
| | | | | 29/243.527 |
| 9,566,640 B1 * | 2/2017 | Yuan | ...................... | B21J 15/386 |

* cited by examiner

*Primary Examiner* — David B Jones
(74) *Attorney, Agent, or Firm* — Wayne & King LLC

(57) ABSTRACT

The present invention discloses a thrust rivet gun comprising a rivet gun holder and a housing disposed outside the rivet gun holder, on either side of which, a handle is respectively hinged by a screw and a nut. Inside the said rivet holder, there is a movable mount, on top of which is connected with a sleeve. On top end of the sleeve, there sets a nozzle. A grove is set on either side of the movable mount and a pin rod is inserted in the groove respectively. The pin rod is hinged with the mounting hole which is on the top end of the handle. The said rivet holder has a dead lever fixed by a nut.

7 Claims, 4 Drawing Sheets

THRUST RIVET GUN

CROSS-REFERENCE TO RELATED APPLICATIONS

This application claims priority to Chinese Patent Application No. 201710616028.1 with a filing date of Jul. 26, 2017 and No. 201720913102.1 with a filing date of Jul. 26, 2017. The content of the aforementioned applications, including any intervening amendments thereto, are incorporated herein by reference.

TECHNICAL FIELD

This invention is related to the field of hand-operated tool technology. Specifically, it is a thrust rivet gun.

BACKGROUND OF THE PRESENT INVENTION

The rivet gun can be applied to the riveting of any sheet materials and tubular products. At present, the rivet gun is widely applied in the riveting of electromechanical and light industry such as automobile, aviation, railway, refrigeration, elevators, switch, instrument, furniture and decoration, etc. The principle of the existing riveting gun is: Firstly, let the rivet stem of the rivet to pass through the nozzle, then open the handles of the rivet gun. The grasping mechanism inside the housing clamps tight of the rivet bottom end, then close the handle, during the process, the handle would lead the pull rod to move backward through the linkage mechanism, and the grasping mechanism also move backward, thus pull back the rivet stem to rivet well of the rivet. However, the existing rivet gun needs to use link mechanism, which not only complicates the structure, but also raise the production cost.

Therefore, the study orientation for researchers in this field is to develop a rivet gun with simple structure, low manufacturing cost and good performance.

SUMMARY OF PRESENT INVENTION

Considering the deficiencies above, the purpose of this invention is to provide a thrust rivet gun with simple structure and low manufacturing cost.

The solution of this invention: thrust rivet gun, including rivet holder and the housing which is set outside the rivet holder, either side of the said rivet holder is hinged with a handle through a screw and a nut. The said rivet holder is equipped with a movable mount inside. The top end of the movable mount is linked with a sleeve and the top of the sleeve has a nozzle. On either side of the said movable mount lays a groove, and a pin rod is inserted in the two grooves respectively. The pin rod is hinged with the mounting hole which is on the top end of the handle. A dead lever is fixed on the said rivet holder. The movable mount is sleeved on dead lever, and the front end of the dead lever has a rivet grasping mechanism.

Further, the said thrust rivet gun has the following features: the said rivet holder is in U shape, which is formed by a bottom holder with a center hole and the stators on either side of the bottom holder. The center hole is for the dead lever to pass through the bottom. The middle of the dead lever is a boss. After the dead lever passes through the center hole, the bottom of the boss is pressed against the top of the bottom holder.

Further, on either the front or back side of the said housing, there are two through-holes. The two stators on the rivet holder are equipped with two piercing-holes respectively. The top end of both of the two handles are equipped with connecting hole which is below the mounting hole. The screw passed through the through-hole on the housing and the through-hole on the rivet holder to be hinged with the connecting hole.

Further, the bottom of the said rivet holder is equipped with a buffer bottle holder, the bottom of the dead lever passes through the buffer bottle holder and a nut is screwed into the bottom of the dead lever. The bottom of the said buffer bottle holder mounts a peg collection bottle by the thread connection. The dead lever is fixed on the rivet holder by a nut.

Further, a retractable spring is set between the rivet grasping mechanism at the front end of the said dead lever and the bottom of the rivet holder.

Further, the said rivet grasping mechanism includes grasper, grasper holder, top rod and reset spring, the said grasper is set inside the grasper holder. The back end of the grasper holder is connected with the top end of the dead lever by thread connection. The said top rod is below the grasper. The reset spring is set inside the axle hole on the top end of the dead lever and the bottom of the top rod is pressed against the top of reset spring.

Further, the top end of both of the two handle 17 are equipped with multiple standby nozzles.

The benefit of using this invention, thrust rivet gun is: when in use, first open the two handles, put the rivet in the nozzle, then close the two handles. The rivet grasping mechanism clamped the rivet stem of the rivet. During the closing process, the screw is served as a pivot, the pin rod moves up and make the moveable mount move upward. Then the movable mount leads the sleeve and nozzle to moving upward. During the process, the nozzle pushes the top end of rivet to move forward. The rivet began to transform, thus the rivet is riveted at the intended position. During the process, no link mechanism is applied, making the structure simpler and the cost lower.

1—rivet holder, 1.1—bottom holder, 1.2—stator, 2—housing, 3—screw, 4—nut, 5—movable mount, 6—sleeve, 7—nozzle, 8—rivet grasping mechanism, 81—grasper, 82—grasper holder, 83—top rod, 84—reset spring, 9.1—boss, 9—dead lever, 91—axle hole, 10—pin rod, 11—groove, 12—buffer bottle holder, 13—nut, 14—pin collecting bottle, 15—retractable spring, 16—standby nozzle, 17—handle, 18—mounting hole, 19—connecting hole, 20—center hole, 21—through-hole, 22—piercing hole.

DETAILED DESCRIPTION OF PREFERRED EMBODIMENTS

Figure 1:
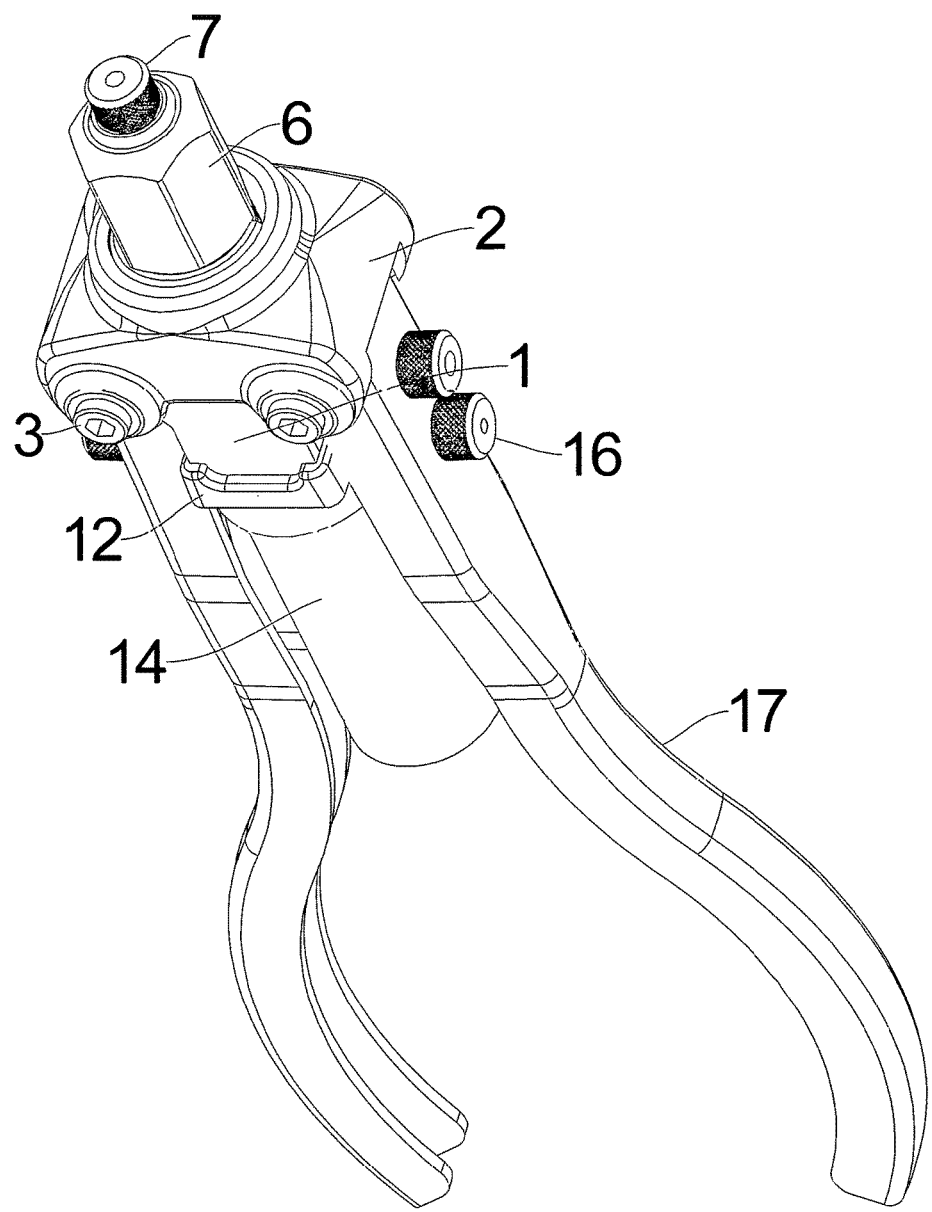
FIG. 1 is the overall structural view of this invention.
Figure 2:
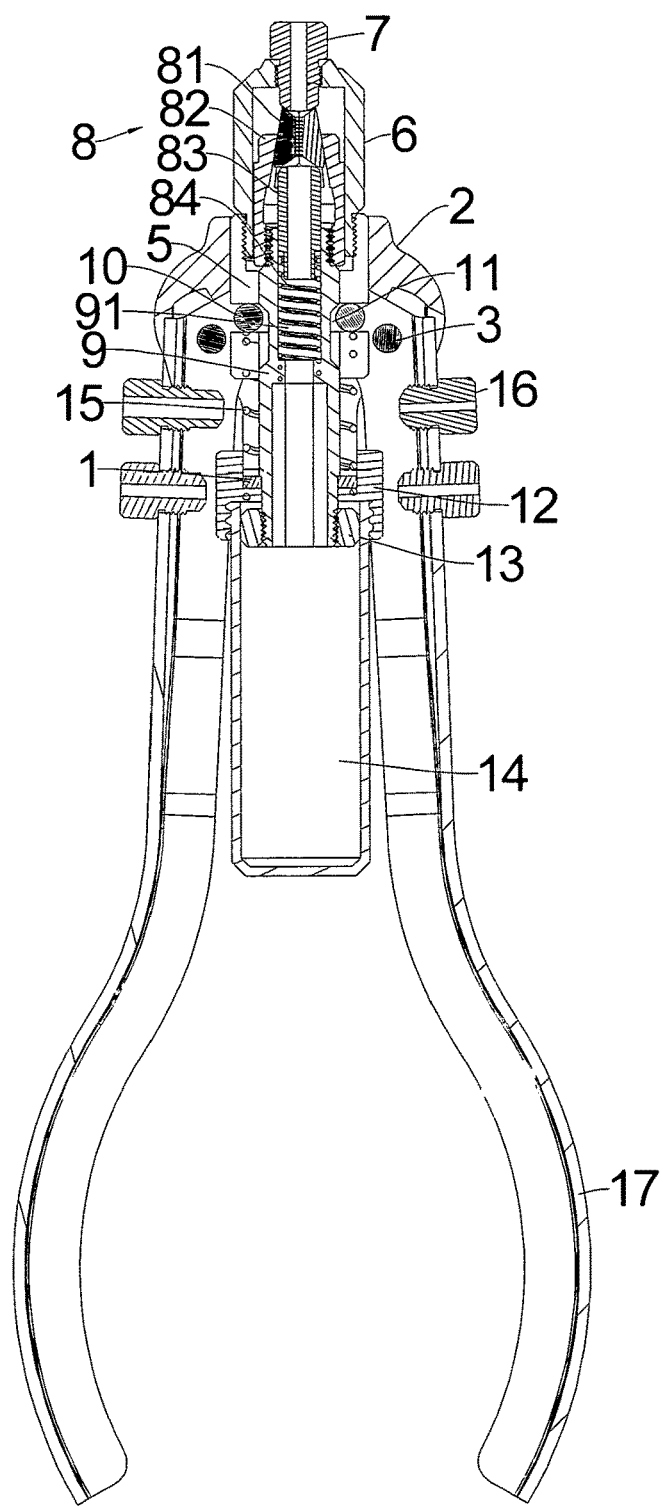
FIG. 2 is the section view of this invention.
Figure 3:
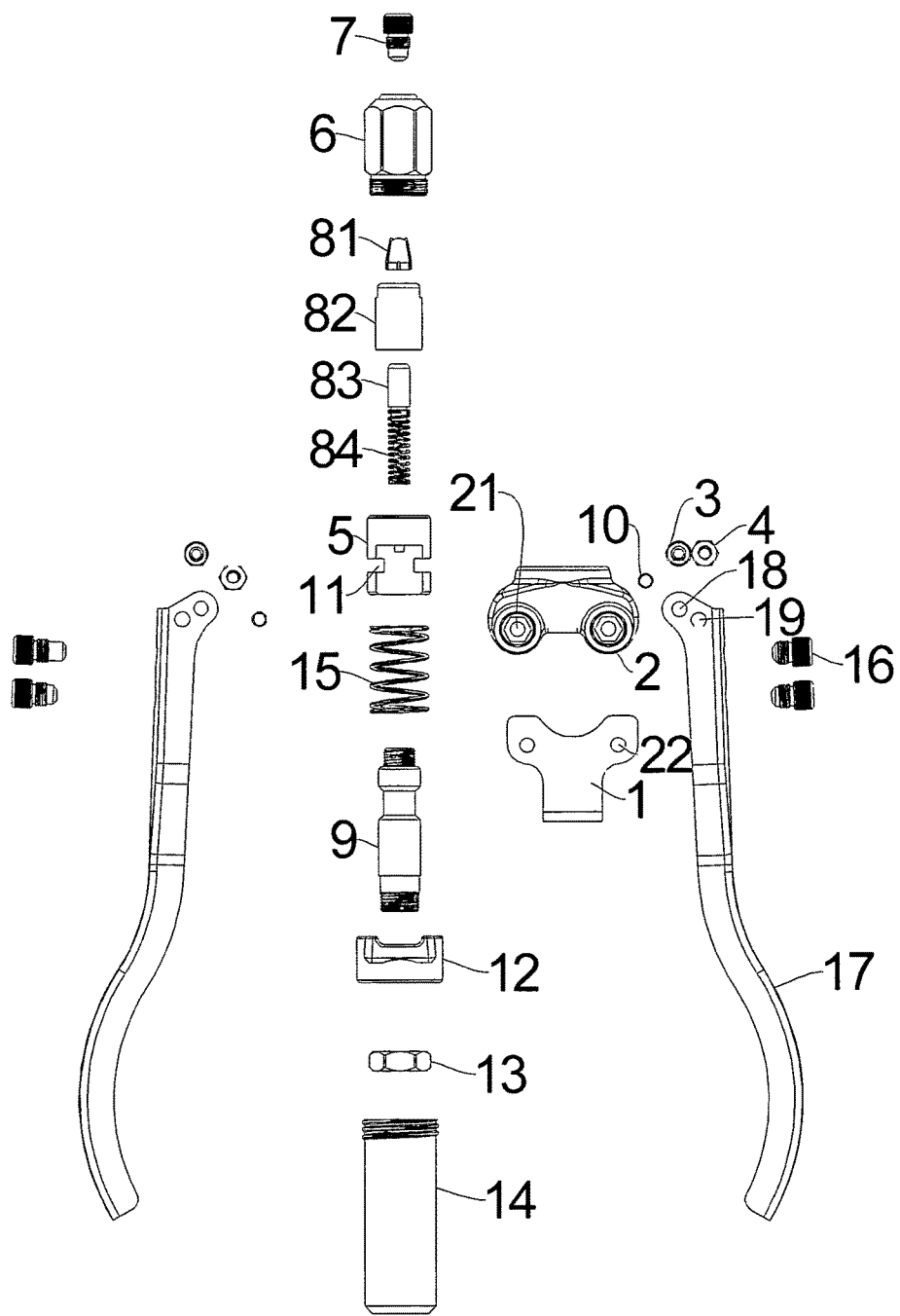
FIG. 3 is the breakdown view of this invention.
Figure 4:
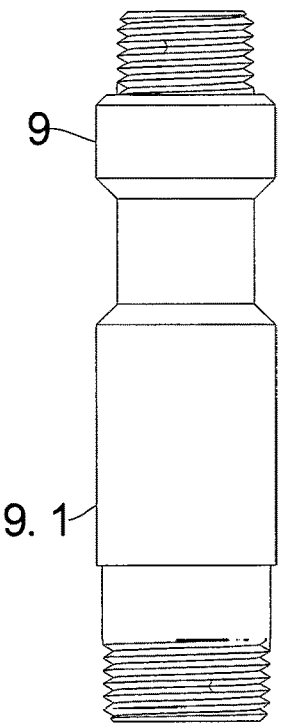
FIG. 4 is the structural view of this invention's dead lever.
Figure 5:
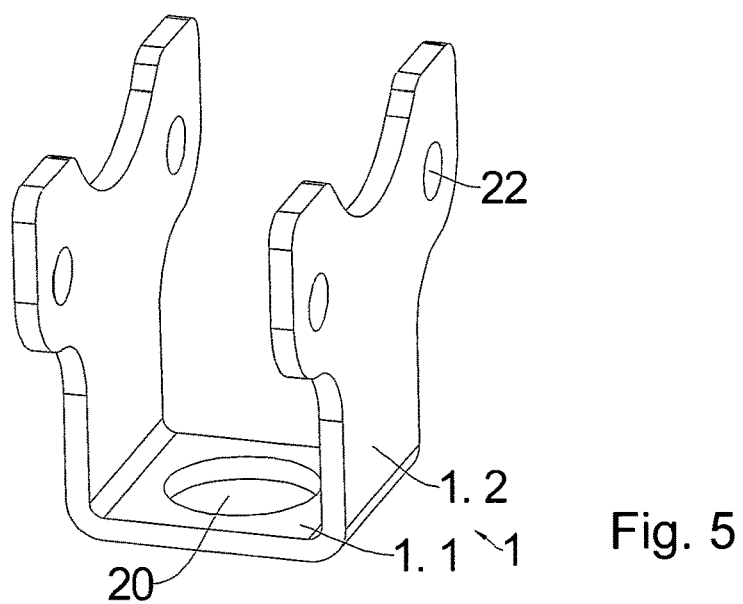
FIG. 5 is the structural view of this invention's rivet holder.

To make the view more intuitive and more understandable, the instructions explaining the features based on the attached drawings are below:

As shown in FIG. 1 to FIG. 5, thrust rivet gun includes a rivet holder (1) and the housing (2) which is set on the rivet holder (1). On either side of the said rivet holder (1) is hinged with a handle (17) by a screw (3) and a nut (4). Inside the said rivet holder (1) lays a movable mount (5), on the top end of which is connected with a sleeve (6), and on top end of the sleeve lays a nozzle (7). On either side of the said movable mount (5) lays a groove (11), and a pin rod (10) is inserted in the two grooves (11) respectively. The pin rod (10) is hinged with the mounting hole (18) which is on the top end of the handle (17). A dead lever (9) is fixed on the said rivet holder (1). The movable mount (5) is sleeved on dead lever (9), and the front end of the dead lever (9) has a rivet grasping mechanism (8).

The said rivet holder (1) is in U shape, which is formed by a bottom holder (1.1) with a center hole (20) and the stators (1.2) on either side of the bottom holder (1.1). The center hole is for the dead lever (9) to pass through the bottom. The middle of the dead lever (9) is a boss (9.1). After the dead lever (9) passes through the center hole (20), the bottom of the boss (9.1) is pressed against the top of the bottom holder (1.1). The shape of the dead lever (9) and the center hole (20) can be adjusted according to the needs. The shape can be round, polygon, etc.

On either the front or back side of the said housing (2), there are two through-holes (21). The two stators (1.2) on the rivet holders (1) are equipped with two through-holes (22) respectively. The top end of both of the two handles (17) are equipped with connecting hole (19) which is below the mounting hole (18). The screw (3) passed through the through-hole (21) on the housing (2) and the through-hole (22) on the rivet holder (1) to be hinged with the connecting hole (19).

The bottom of the said rivet holder (1) is equipped with a buffer bottle holder (12), the bottom of the dead lever (9) passes through the buffer bottle holder (12) and a nut (13) is screwed into the bottom of the dead lever (9). The bottom of the said buffer bottle holder (12) mounts a peg collection bottle (14) by the thread connection. The dead lever (9) is fixed on the rivet holder (1) by a nut (13). A retractable spring (15) is set between the rivet grasping mechanism (8) at the front end of the said dead lever (9) and the bottom of the rivet holder (1). When handles 17 open, the retractable spring (15) would be retracted; when the handles (17) close, the retractable spring 15 releases elastic force to reset the handles (17).

The said rivet grasping mechanism (8) includes grasper (81), grasper holder (82), top rod (83) and reset spring (84), the said grasper (81) is set inside the grasper holder (82). The back end of the grasper holder (82) is connected with the top end of the dead lever (82) by thread connection. The said top rod (83) is below the grasper (81). The reset spring (84) is set inside the axle hole (91) on the top end of the dead lever (9) and the bottom of the top rod (83) is pressed against the top of reset spring (84). When the handles 17 open, nozzle 7 moves downward and opens grasper 81, at the same time, it pushes grasper 81 downwards, and makes top rod 83 push reset spring 84 downwards. At the time, out in the rivet, the stem of the rivet inserts in the grasper, then close the handles 17. The reset spring 84 release the elastic force to lead the top rod 83 to moving upward. The top rod 83 pushes up the grasper 81, which would clamp the rivet stem tight.

Of course, the rivet grasping mechanism 8 at the front end of dead lever 9 can be changed to other shapes, as long as it can clamp tight the rivet.

The top end of both of the two handle 17 are equipped with multiple standby nozzles (16). The standby nozzles are all in different size so as to be able to coordinated with rivets with different sizes.

When in use, firstly, open the two handles (17), put the rivet in the nozzle 7, then close the two handles 17. The rivet grasping mechanism 8 clamped the rivet stem of the rivet. During the closing process, the screw 3 is served as a pivot, the pin rod 10 moves up and make the moveable mount 5 move upward. Then the movable mount 5 leads the sleeve 6 and nozzle 7 to moving upward. During the process, the nozzle 7 pushes the top end of rivet to move forward. The rivet began to transform; thus the rivet is riveted at the intended position. During the process, no link mechanism is applied, making the structure simpler and the cost lower.

Of course, the above is only a preferred embodiment of this invention. Therefore, the present invention is not limited in the present patent scope. Any simple modification of the equivalent structural change based on the application of the instruction and drawings are within the patent protection of the present invention.

I claim:

1. A thrust rivet gun, comprising:
   a rivet holder comprising a bottom;
   a housing on the rivet holder comprising two sides; two handles comprising a top end on each handle, wherein the rivet holder is hinged with each handle by a screw and a nut;
   a movable mount inside the rivet holder, wherein the movable mount has two sides and a top end;
   a groove at either side of the movable mount;
   a pin rod inserted in each of the grooves, wherein the pin rod is hinged with the top end of the handle through a mounting hole;
   a sleeve comprising a tope end, wherein the top end of the movable mount is connected with the sleeve;
   a nozzle, wherein the nozzle lies on the top end of the sleeve;
   a dead lever fixed on the rivet holder comprising a front end and a bottom end, wherein the movable mount is sleeved on the dead lever; and
   a rivet grasping mechanism at the front end of the dead lever, wherein the rivet grasping mechanism comprises a grasper, a grasper holder, a top rod and a reset spring.

2. The thrust rivet gun according to claim 1, wherein the rivet holder is in U shape and further comprises a bottom holder comprises two sides, a top end, and a center hole and stators on either side of the bottom holder, wherein the a lever passes through the bottom holder through the center hole, and wherein a boss located at the middle of the dead lever is pressed against the top end of the bottom holder.

3. The thrust rivet gun according to claim 2, further comprising two through-holes on either side of the housing, two through-holes on the two stators respectively, a mounting hole on the top end of each handle, a connecting hole below each mounting hole, and screws passing through the through-holes on the housing and through-holes on the statorsto hinge with the connecting holes.

4. The thrust rivet gun according to claim 1, wherein the bottom of the rivet holder is equipped with a buffer bottle holder comprising a bottom end, wherein the bottom end of the dead lever passes through the buffer bottle holder and wherein another nut is screwed into the bottom end of the dead lever, wherein the bottom end of the buffer bottle holder mounts a peg collection bottle by the thread connection, and wherein the dead lever is fixed on the rivet holder by the another nut.

5. The thrust rivet gun according to claim 1, further comprising a retractable spring between the rivet grasping mechanism at the front end of the dead lever and the bottom of the rivet holder.

6. The thrust rivet gun according to claim 1, wherein the grasper holder comprises a back end, wherein the back end of the grasper holder is connected with the front end of the dead lever by thread connection, wherein the top rod is below the grasper, wherein the reset spring comprises a top end and is set inside an axle hole on the front end of the dead lever, and wherein the bottom of the top rod is pressed against the top end of reset spring.

7. The thrust rivet gun according to claim 1, wherein the top end of both of the two handles are equipped with multiple standby nozzles.

\* \* \* \* \*